United States Patent
Desjardins et al.

(12)
(10) Patent No.: US 6,394,241 B1
(45) Date of Patent: May 28, 2002

(54) ENERGY ABSORBING SHEAR STRIP BENDER

(75) Inventors: Stanley Desjardins, Tempe; Gary Brown, Gilbert, both of AZ (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/421,413

(22) Filed: Oct. 21, 1999

(51) Int. Cl.$^7$ ................................................. F16F 7/12
(52) U.S. Cl. .................... 188/376; 188/371; 244/122 B; 248/548; 280/750; 280/805; 297/472
(58) Field of Search ................. 188/65.1–65.3, 188/371, 376, 377; 182/5; 244/122 B; 248/548; 256/13.1; 280/748, 750, 805; 297/472; 404/10

(56) References Cited

U.S. PATENT DOCUMENTS

| | | | |
|---|---|---|---|
| 2,785,775 A | * 3/1957 | Stevinson | .................... 188/101 |
| 3,106,989 A | * 10/1963 | Fuchs | ............................. 188/1 |
| 3,289,792 A | * 12/1966 | Moberg | ........................... 188/1 |
| 3,415,411 A | * 12/1968 | Saunders | ..................... 220/54 |
| 3,438,674 A | * 4/1969 | Radke et al. | ................ 297/386 |
| 3,973,650 A | * 8/1976 | Nagazumi | .................. 188/1 C |
| 4,358,136 A | 11/1982 | Tsuge et al. | |
| 4,399,925 A | * 8/1983 | Fundom | ...................... 220/269 |
| 4,951,522 A | 8/1990 | Chowdhury et al. | |
| 5,052,716 A | * 10/1991 | Matsumoto | ................ 280/777 |
| 5,201,558 A | * 4/1993 | Thum | ......................... 293/133 |
| 5,286,056 A | 2/1994 | Speich | |
| 5,356,179 A | 10/1994 | Hildebrandt et al. | |
| 5,487,562 A | 1/1996 | Hedderly et al. | |
| 5,497,675 A | 3/1996 | Brown et al. | |
| 5,609,063 A | 3/1997 | Hedderly et al. | |
| 5,609,365 A | 3/1997 | Holka | |
| 5,639,144 A | 6/1997 | Naujokas | |
| 5,658,012 A | * 8/1997 | Villareal et al. | ............. 280/805 |
| 5,690,363 A | 11/1997 | Rybinski | |
| 5,706,704 A | 1/1998 | Riefe et al. | |
| 5,720,496 A | 2/1998 | Riefe et al. | |
| 5,738,377 A | * 4/1998 | Sugiki et al. | ................ 280/777 |
| 5,755,461 A | 5/1998 | Halacka et al. | |
| 5,788,278 A | 8/1998 | Thomas et al. | |
| 5,799,760 A | * 9/1998 | Small | ......................... 188/371 |
| 5,813,649 A | 9/1998 | Peterson et al. | |
| 6,170,873 B1 | * 1/2001 | Jurik et al. | .................. 280/777 |
| 6,231,095 B1 | * 5/2001 | Chou et al. | .................. 293/133 |
| 6,270,131 B1 | * 8/2001 | Martinez et al. | ............ 293/132 |

* cited by examiner

*Primary Examiner*—Christopher P. Schwartz
*Assistant Examiner*—Benjamin A Pezzlo
(74) *Attorney, Agent, or Firm*—Shaw Pittman LLP

(57) ABSTRACT

A simple, low cost energy absorbing shear strip bender that provides constant load, tailored load, or adjustable load/displacement profiles for use in any application where a single use energy absorber is required. Examples include, but are not limited to: a spinal load attenuator for use in crash-resistant aircraft seats; crash-resistant aircraft landing gear; aircraft or automotive restraint harness attachments; cargo or high-mass item tie-downs; automotive bumper attachments; and collapsible steering columns. The present invention comprises a shear plate or other base material, a shear strip integral to the shear plate, and a shear strip tab, all of which are formed from a single sheet of ductile material. The energy absorber attaches to two objects and begins to displace when opposing forces applied to the shear plate and shear strip tab reach the design limit value such that shear strip shears and plastically deforms, i.e., bends. The load that must be applied to stroke the energy absorber is the sum of the shearing force and the bending force. The direction of motion is generally parallel to the shearing plate, but may deviate from parallel by as much as 90°.

13 Claims, 11 Drawing Sheets

ENERGY ABSORBING SHEAR STRIP BENDER

BACKGROUND

1. Field of the Invention

The present invention relates to energy absorbing devices. More specifically, the present invention relates to an energy absorbing and load limiting device that can be used in a wide variety of applications, such as helicopter, aircraft, and space vehicle seating mechanisms, automotive or aircraft restraint harness attachments, cargo or high-mass item tie-downs, automotive bumper attachments, and collapsible steering columns.

2. Background of the Invention

Most prior art energy absorbing devices use either bending or shearing to absorb energy by converting kinetic energy into work. Also, most prior art energy absorbers use multiple components, which increases the cost and complexity of these devices.

U.S. Pat. No. 4,358,136 discloses an energy absorbing device for use with a vehicular seat belt. This energy absorber requires multiple parts, including a housing and a metal strip. The energy absorption of this device is a function of friction and plastic deformation of the metal strip, but not shearing. Friction loads will vary, as a function of the speed of operation, and may be altered by contaminants such as oil or dirt.

U.S. Pat. No. 5,639,144 discloses an energy absorbing child seat fastener. This device uses a combination of shear and plastic deformation of a plate to provide energy absorption. However, the weight efficiency of the device is limited because of the single shear plane and the limited amount of bending that occurs during operation. Because the shearing and plastic deformation follow a spiral path, the resultant load from the absorber cannot, in practice, be a constant value or follow a tailored profile. Additionally, the absorber only responds effectively to loads that are applied essentially perpendicular to the plate.

SUMMARY OF THE INVENTION

The present invention is a simple, low cost energy absorbing shear strip bender that can be configured to provide constant loads, tailored loads, or adjustable loads. As shown in FIGS. 1a and 1b, the energy absorber of the present invention is a single part comprising a shear plate, a shear strip tab integral to the shear plate, guide grooves in the shear plate, a shear strip integral to the shear plate, a means for attaching the shear strip tab to a first object, and a means for attaching the shear plate to a second object.

The invention may be fabricated from a single sheet or plate of ductile material, e.g., aluminum, steel, polyethylene, polypropylene, or composite materials. Two through-cuts are made on one side of the sheet to form a shear strip tab, preferably, but not necessarily, of a rectangular shape. This shear strip tab is bent about 180°, preferably to produce the smallest possible radius without fracture of the material. The remaining (un-bent) sheet material forms the shear plate.

As used herein in the specification and in the claims, the term plate means any base material from which the invention is formed. The plate could be flat, spherical, cylindrical, or any shape compatible with the shear strip process. Preferably, the shape of the plate is the shape most compatible with the mating parts within the system.

Starting from both sides of the shear strip tab, guide grooves are cut or otherwise formed on the surface of the shear plate, to establish the paths along which the shear strip will bend and tear. These grooves reduce the material thickness, making the structure weaker than the remaining portions of the shear plate. The material thus shears along the grooves longitudinally, forming an increasing tab length that plastically deforms. In addition, although grooves are described in this specification and the claims for illustration purposes, it should be understood that other forms of structural weakening, e.g., perforations, would suffice to establish the paths along which the shear strip bends and tears.

The present invention absorbs energy by shearing the shear strip tab from the shear plate, along the guide grooves and bending it in the direction of the applied force. To create this action, two opposing forces (one is in reaction to the other) must be independently applied to the shear plate and shear strip tab. Thus, the shear plate attaches to a first object (such as a seat bucket) while the shear strip tab attaches to a second object (such as a structural component of a vehicle), wherein there would be relative motion between the first and second objects (in the event of a crash). As the objects pull in different directions, the load on the energy absorber increases until it reaches a predetermined load limit whereupon the shear strip begins to shear and bend away from the shear plate. The shearing and bending of the shear strip results in a controlled load during displacement, separating the two objects. This displacement is also referred to as "stroke." The direction of relative motion of the objects is generally parallel to the shearing plate but may vary up to 90°.

In addition to vehicle seats, the present invention could be used in many other applications. For instance, in an automobile bumper system, the shear plate could be attached to the vehicle structure while the shear strip tab attaches to the bumper itself. In a seat belt application, the shear plate could be attached to the seat structure while the shear strip tab attaches to a seat belt fastener. As a final example, for an automobile steering column assembly, the shear plate could be attached to the vehicle structure while the shear strip tab attaches to the steering column. In essence, the present invention is suitable for any application in which the energy displacing two connected objects must be absorbed and the load controlled. As mentioned above, further examples of objects that can be coupled together by the energy absorber include aircraft or other vehicle seating mechanisms, energy absorbing landing gear, automotive or aircraft restraint harness attachments, cargo or high-mass item tie-downs, automotive bumper attachments, and collapsible steering columns.

Many other applications exist. These include, but are not limited to, emergency elevator braking mechanisms, shock snubbers, and earthquake protection attachments that absorb energy from relative motion between structures such as buildings or bridges. There are many applications where loads need to be limited to a predetermined value, where energy needs to be absorbed, or where relative motion between objects is needed without losing structure attachment. Shock load snubbing could be used inside electronic devices to limit the loads and protect sensitive electronic gear from experiencing excessive loads if dropped or impacted by another object.

The load limit of the energy absorber is the sum of the force required to shear the shear strip and the force required to bend the shear strip. The predetermined load of the energy absorber can be controlled by selecting parameters such as the material shear strength, the material tensile strength, the material thickness, the material modulus, the shear guide groove depth relative to the base material thickness, the shear guide groove placement, the distance between shear guide grooves, the direction of loading and the bend radius. Using combinations of these parameters and selectively changing the parameters as the system strokes, the present invention can be implemented as an energy absorber with a constant load/displacement profile, a tailored load/displacement profile, or an adjustable load/displacement profile, as desired. It is also possible to provide a tailored or adjustable load/displacement profile by selectively engaging multiple shear strips.

In a preferred embodiment of the present invention, a constant load energy absorber is formed using two substantially parallel shear guide grooves of uniform depth. With the forces applied parallel to the surface of the shear plate of a given thickness, the constant load limit is a function of the guide groove depth, the width of the shear strip (the distance between the guide grooves), and the structural properties of the energy absorber material.

In another preferred embodiment of the present invention, a tailored load energy absorber is formed by varying the material thickness of the shear plate and shear strip, the depth of the guide grooves, direction of the applied load, and/or the width of the shear strip. Changing these variables either increases or decreases the force required to shear or bend the shear strip, to facilitate the tailoring of the energy absorber for specific varying load patterns.

In another preferred embodiment of the present invention, the load/displacement profile of the energy absorber is adjustable, such that a user can select from a predetermined series of loads. The adjustable load energy absorber features multiple shear strip tabs, each providing a specific load limit. By attaching to one or more of the shear strip tabs, the user can adjust the load limit to suit the particular application for which the energy absorber is being used. The more shear strip tabs that are attached, the higher the load limit.

As an alternative to multiple shear strip tabs, an adjustable load energy absorber could use a dial or other mechanical device to set a cutting or scoring blade to produce a specific guide groove depth. Adjusting the blade to furnish a deeper cut would lower the load limit of the energy absorber.

Accordingly, an object of the present invention is to provide a simple, low cost, tailored load (including constant load) energy absorber that is free from the difficulties and disadvantages found in the prior art.

Another object of the present invention is to provide a simple energy absorber requiring only one primary component.

Another object of the present invention is to provide high efficiency load limiting through a combination of plastic deformation and shearing action.

Another object of the present invention is to provide an energy absorber that absorbs energy applied in any direction ranging from parallel to the shear plate to perpendicular to the shear plate.

These and other objects of the present invention are described in greater depth in the detailed description of the invention, the appended drawings, and the attached claims.

BRIEF DESCRIPTION OF THE DRAWINGS

FIG. 1b is a schematic drawing of a top view of the energy absorbing shear strip bender shown in FIG. 1a.

FIG. 2b is a schematic drawing of a bottom view of the energy absorbing shear strip bender shown in FIG. 2a.

DETAILED DESCRIPTION OF THE INVENTION

Figure 1A:
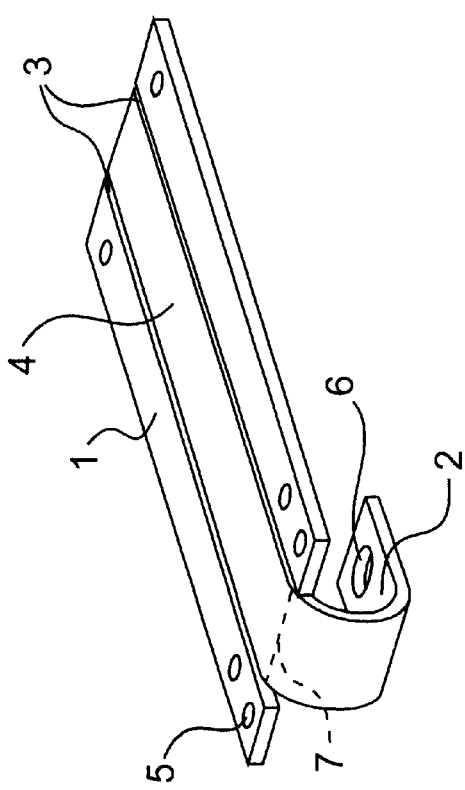
FIG. 1a is a schematic drawing of a bottom view of an energy absorbing shear strip bender.
Figure 1B:
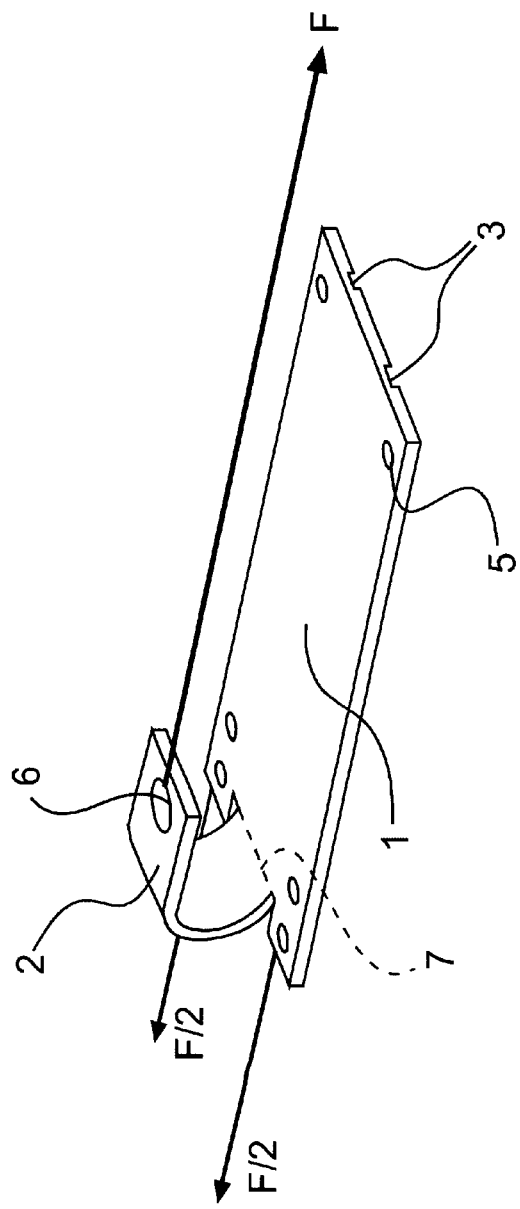

As shown in FIGS. 1a and 1b, the primary components of the present invention are a shear plate 1, a shear strip tab 2, shear guide grooves 3, shear strip 4, a means for attaching shear plate 5, and a means for attaching shear strip tab 6. In the preferred embodiment, the components are integrally formed from a single sheet or plate of material. The size of the plate material and the size of the individual components of the energy absorber depend on the level and geometry of the loads that the invention is designed to withstand.

To construct the present invention, a tab is stamped, cut, or otherwise formed on one end of shear plate 1. This tab is bent about 180° to form shear strip tab 2. Alternatively, shear strip tab 2 could be formed by first placing shear guide grooves 3 in the shear plate 1 and then shearing and bending the strip between the shear guide grooves 3 for a small distance. Regardless of the method of forming shear strip tab 2, shear strip tab 2 is initially bent to substantially align with the direction of the load.

With the shear strip tab 2 formed, shear plate 1 and shear strip tab 2 share a common edge 7. As used in this specification and claims, common edge 7 means the line along which, or area within which, shear plate 1 transitions into the shear strip tab 2.

Two or more shear guide grooves 3 are cut or otherwise formed on one or both faces of shear plate 1. Shear guide grooves 3 define shear strip 4, which is the extension of shear strip tab 2. As shown in FIGS. 1a and 1b, shear guide grooves 3 are preferably substantially parallel to produce a constant load/displacement profile. However, in another embodiment of the present invention, the distance between shear guide grooves 3 varies, i.e., the grooves converge or diverge, to provide tailored load resistance. Alternatively, shear guide grooves 3 could be some other form of structural weakening of the shear plate 1, e.g., perforations or other forms of structural weakening.

In the preferred embodiment, the means for attaching shear strip tab 6 and the means for attaching shear plate 5 are holes into which fasteners are installed to secure the invention to two independent objects. FIG. 1a shows this preferred embodiment with multiple holes formed along the longitudinal axis of shear plate 1, and a single hole formed in shear strip tab 2. However, any number of attachment methods, e.g., welding, gluing, molding, or stitching, could be used to suit specific applications. Because the energy absorber works by controlling loads that cause the relative displacement of two objects, there must be at least one attachment means in shear plate 1 and at least one attachment means in shear strip tab 2.

In the preferred embodiment, the present invention is formed from a homogenous material with ductile properties that allow for significant bending, first in one direction and then back in the opposite direction, without fracture, e.g., a metal sheet such as steel, or aluminum, or a plastic sheet such as polypropylene, polyethylene, or nylon. However, other materials may be used to suit the requirements of particular applications. For example, composite materials exhibiting similar bending and shear properties are suitable. And as an added benefit, composite fibers or plies can be oriented to customize the amount and direction of force required to shear and bend the material.

To provide a constant load/displacement profile, the material used must be well characterized, and must have uniform structural properties. For tailored load/displacement profiles, the material may also have uniform structural properties, in which case other variables account for changes in load resistance. Alternatively, the tailored load material may have non-uniform structural properties along the length of shear plate 1 to produce the changes in load resistance.

Under applied load conditions, e.g., a restraint harness attached to the invention during a crash, the energy absorber operates as follows. As the load is first applied, shear strip tab 2 initially resists any shearing or bending. Once the force F of the load (opposed by F/2 and F/2), as shown in FIG. 1b, reaches a predetermined value, shear strip 4 begins to shear along shear guide grooves 3. Shear strip tab 2 is then pulled along the longitudinal axis of shear plate 1, in a direction of motion that is generally parallel to shear plate 1. The process of shearing shear plate 1 and shear strip 4, and bending shear strip 4, permits a relative movement of one object with respect to the other object, as long as force F exceeds a predetermined load value.

The predetermined load at which shear strip 4 will shear can be controlled by selecting parameters and dimensions for the shear strip and plate including, but not limited to, material shear strength, material tensile strength, material modulus, material thickness, shear guide groove depth, shear guide groove placement, distance between shear guide grooves, and moment of inertia of the section in bending.

The depth and distance between shear guide grooves 3 significantly affect the predetermined load. The depth of shear guide grooves 3 determines the thickness of shear plate 1 that force F must shear. For a constant load/displacement profile, the depth of shear guide grooves 3 is uniform. To produce a variable load/displacement profile, the depth of shear guide grooves 3 may be non-uniform. The distance between shear guide grooves affects the force required to plastically deform, i.e., bend, shear strip 4. The wider the distance, the greater the force required for plastic deformation. The distance between shear guide grooves 3 must be selected to produce a shear strip width strong enough to carry the desired load plus a margin of safety. The distance between shear guide grooves 3 may be uniform or variable to produce a constant load or tailored load/displacement profile, respectively.

In addition to the preferred embodiment illustrated in FIGS. 1a and 1b, it would be apparent to one of ordinary skill in the art that there are numerous configurations of the present invention that can be used to produce constant, tailored, variable, or adjustable load/displacement profiles. FIGS. 2 through 8 illustrate examples of configurations that provide particular load/displacement profiles. The examples are provided to illustrate certain embodiments of the present invention and are not to be construed as limiting the scope of the invention in any way.

Figure 2A:
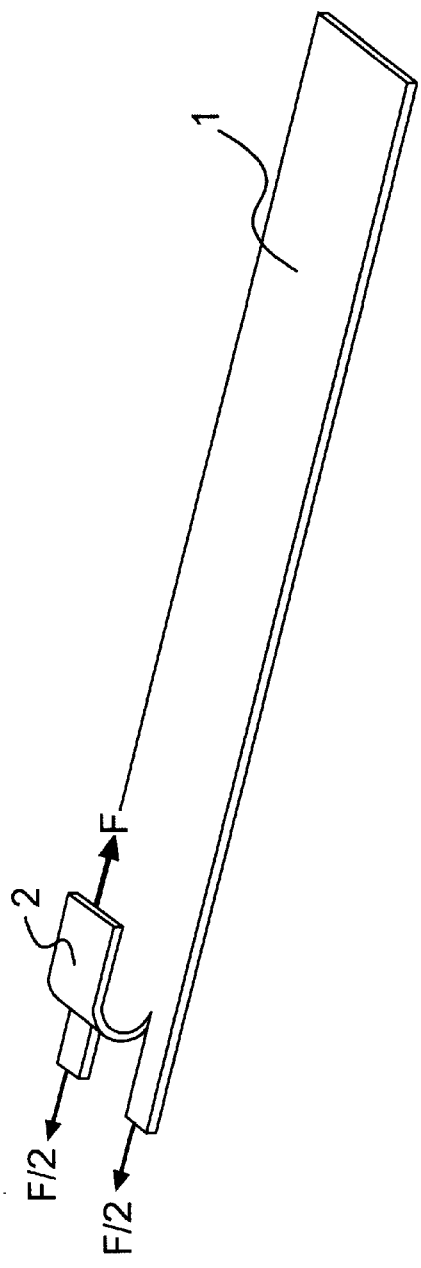
FIG. 2a is a schematic drawing of a top view of an energy absorbing shear strip bender that provides a constant load/displacement profile.
Figure 2B:
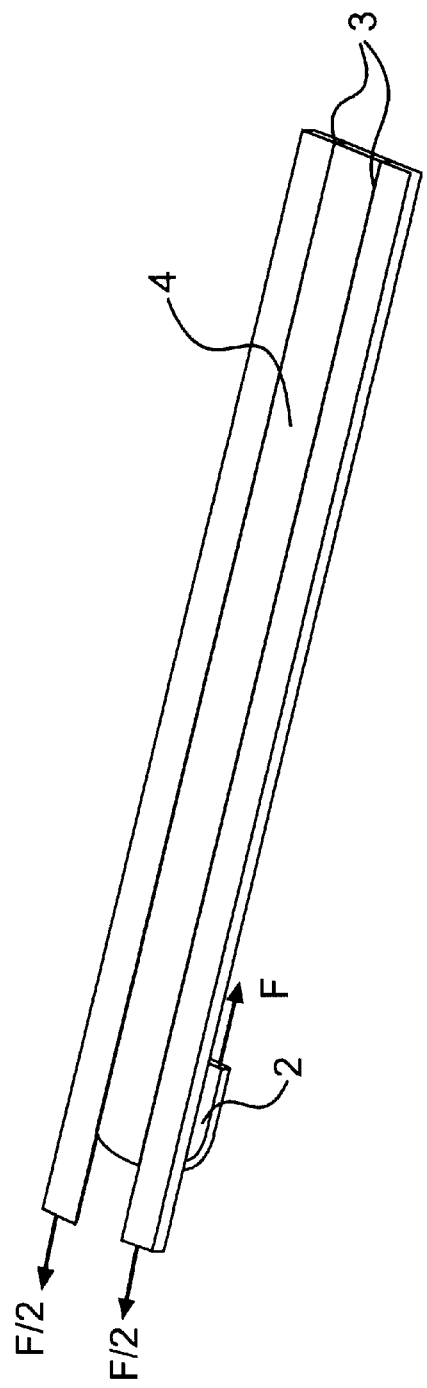
Figure 2C:
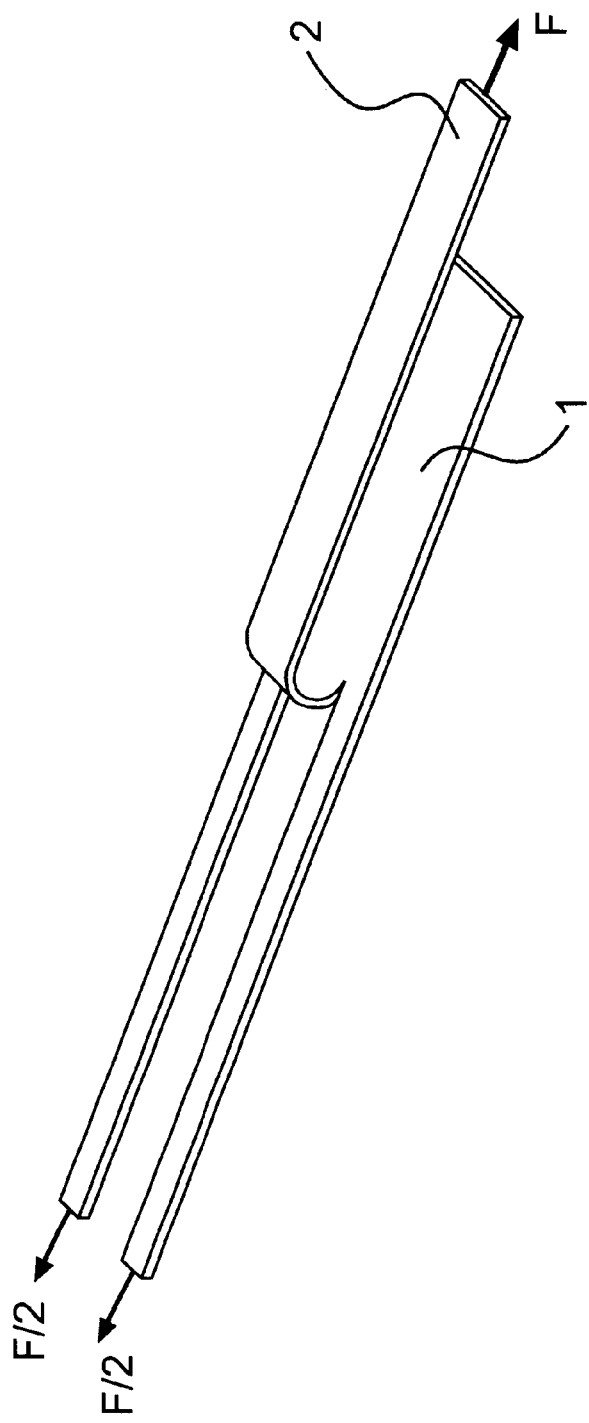
FIG. 2c is a schematic drawing of the energy absorbing shear strip bender shown in FIG. 2a following the relative displacement (or "stroking") of the objects attached to either side of the energy absorber.

As shown in FIGS. 2a through 2c, to provide an energy absorber with a constant load/displacement profile, the preferred embodiment of the present invention uses two parallel guide grooves of equal, constant depths across shear plate 1. Along with the structural characteristics of the energy absorber material, the thickness and depth of the shear guide grooves 3 and the distance between the shear guide grooves 3 determine the energy absorbing or limit load F (opposed by F/2 and F/2). The length of the shear guide grooves 3 determines the maximum possible energy absorbing displacement between the two attached objects. FIG. 2c shows shear strip tab 2 pulled approximately halfway through the length of the entire energy absorbing displacement.

Figure 3:
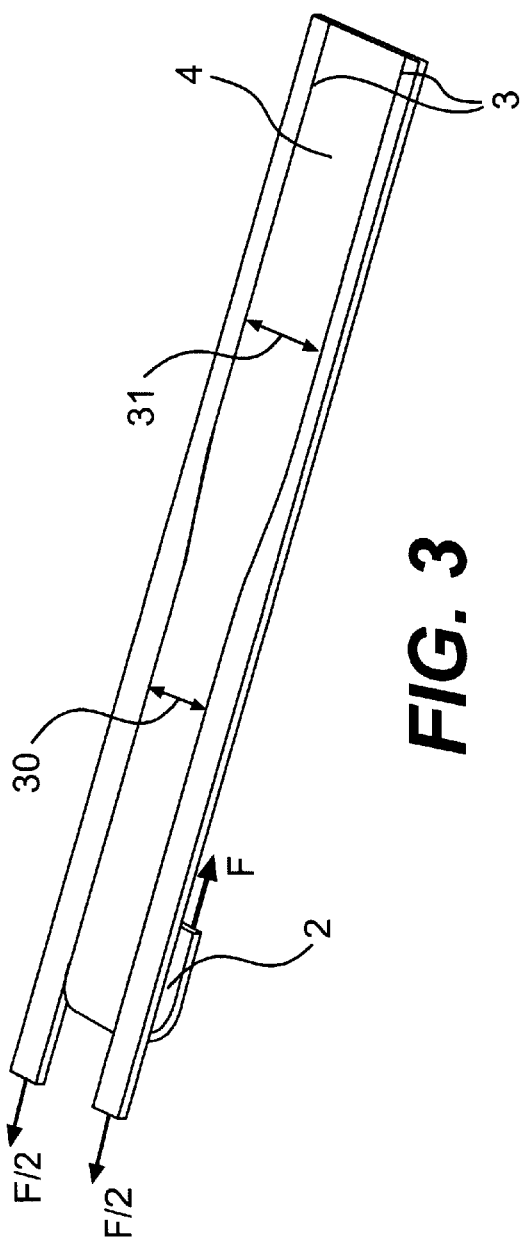
FIG. 3 is a schematic drawing of a tailored load energy absorbing shear strip bender with a variable shear strip width.

To construct an energy absorber with a tailored load/displacement profile, the preferred embodiment of the present invention varies the structural elements such as the guide groove depth, the shear strip width, and the material thickness. For example, as shown in FIG. 3, the energy absorber could use a constant guide groove depth but a variable shear strip width. In this manner, the energy absorber provides a lower load limit for the narrower shear strip width 30 and a higher load limit for the wider shear strip width 31. Thus, the energy absorber can produce a variety of increasing or decreasing load patterns.

Figure 4:
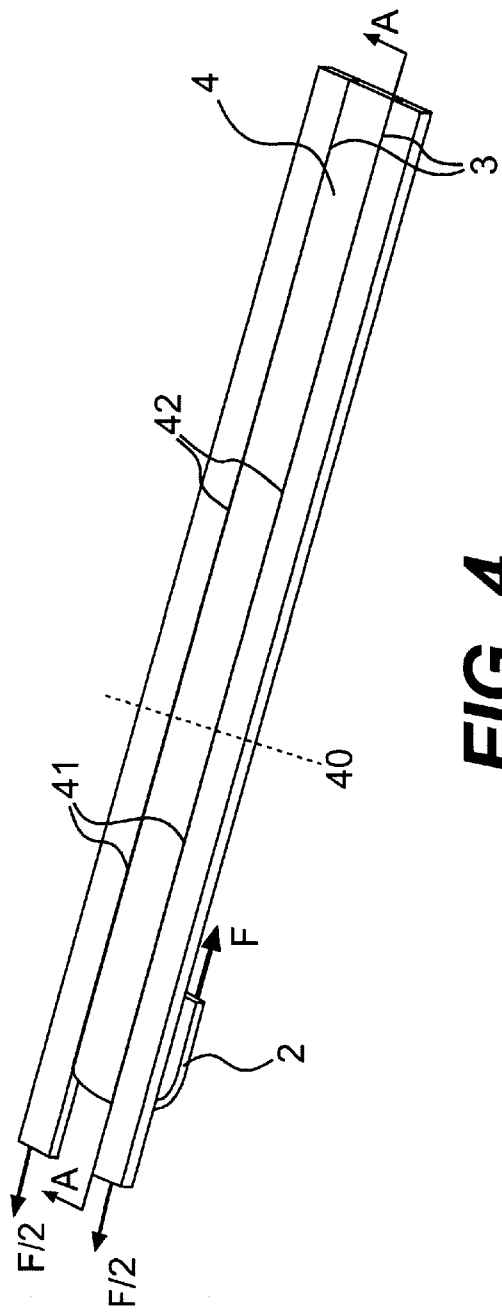
FIG. 4 is a schematic drawing of a tailored load energy absorbing shear strip bender with a variable guide groove depth.
Figure 4A:
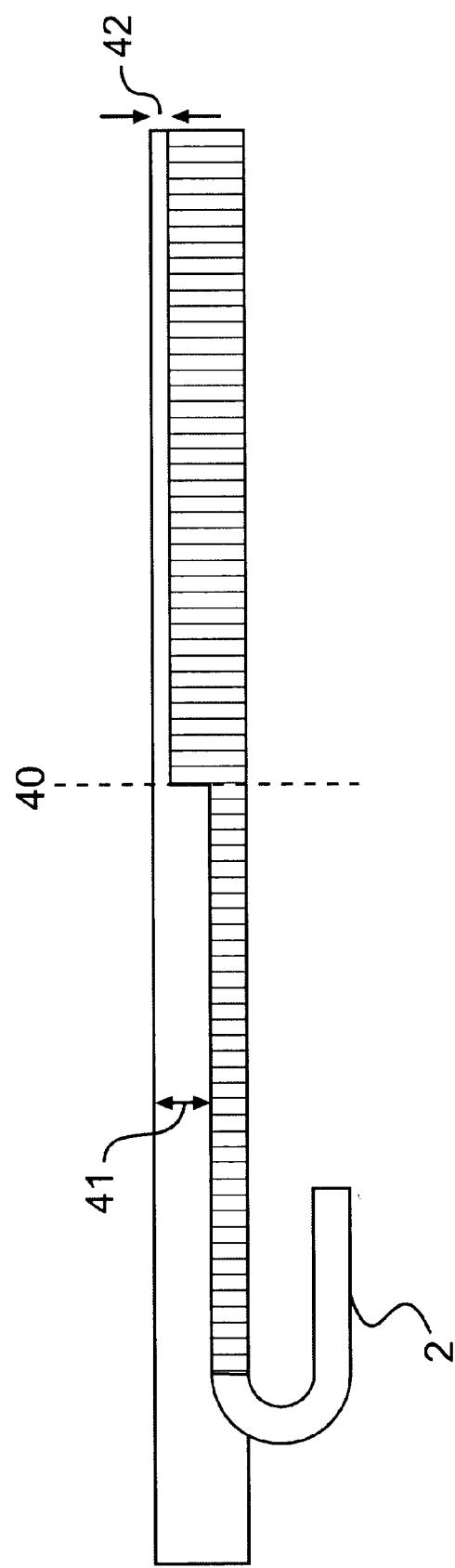
FIG. 4a is a sectional view of the tailored load energy absorbing shear strip bender shown in FIG. 4 along line A—A.

As another example of tailored load/displacement profiles, the energy absorber can be designed to have a constant shear strip width and a variable guide groove depth, as shown in FIG. 4. In this configuration, as the depth of a guide groove increases the load limit of the energy absorber decreases. Increases or decreases in load limits can be stepped functions made by a step change in the guide groove depth or can be a gradual load change produced by a gradual, ramped change in guide groove depth. FIG. 4 shows a stepped change in load limit at datum 40, where the first depth 41 is different than the second depth 42. FIG. 4a is an enlarged sectional view of the energy absorber shown in FIG. 4, showing the stepped change at datum 40 where the first depth 41 is greater than the second depth 42.

Figure 5:
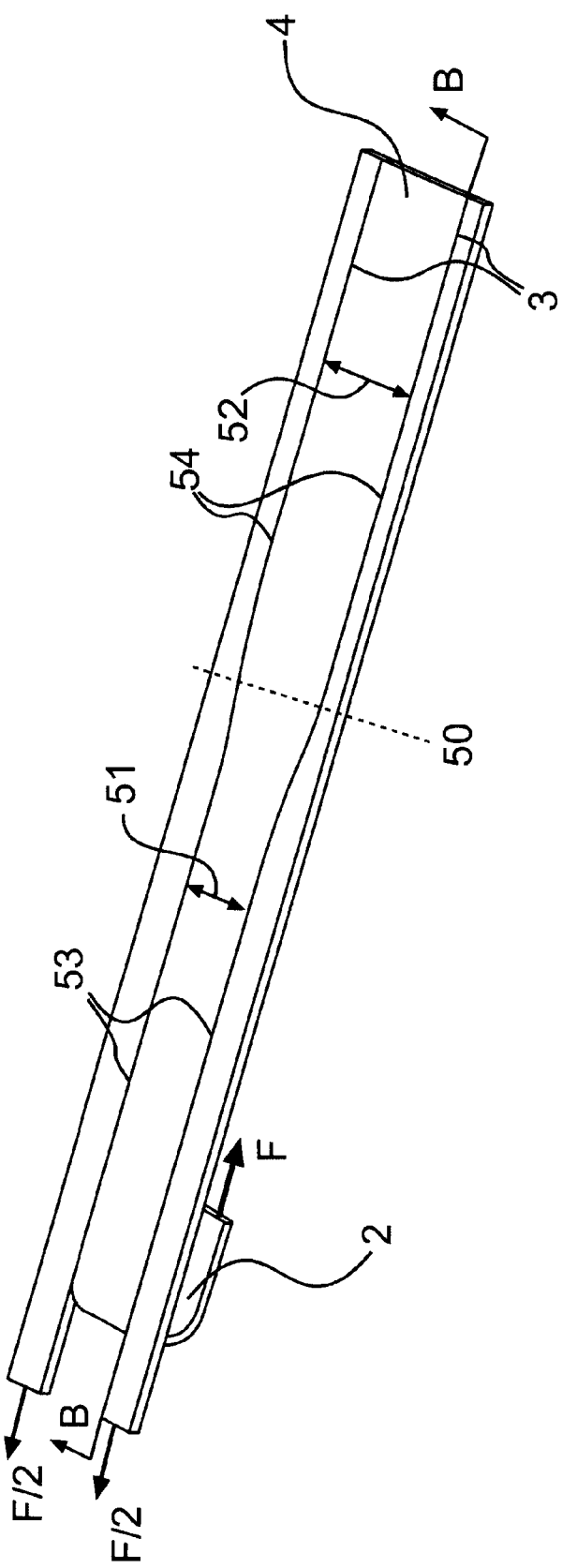
FIG. 5 is a schematic drawing of a tailored load energy absorbing shear strip bender with a variable guide groove depth and a variable shear strip width.
Figure 5A:
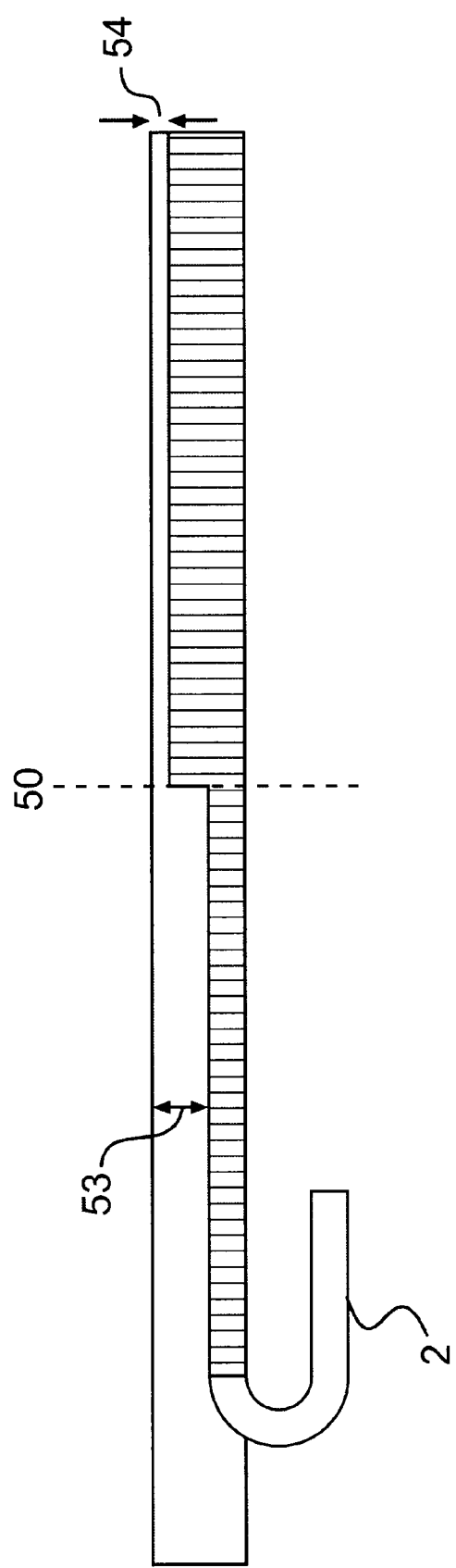
FIG. 5a is a sectional view of the tailored load energy absorbing shear strip bender shown in FIG. 5 along line B—B.

Another example of tailored load/displacement profiles is shown in FIG. 5, where both a variable shear strip width and also a variable guide groove depth produce changes in the energy absorber load limit. Here, at datum 50, both the depth of shear guide grooves 3 and the width of shear strip 4 change. The shear strip width changes from narrower shear strip width 51 to wider shear strip width 52, while the guide groove depth changes from a deeper depth 53 to a more shallow depth 54. FIG. 5*a* shows an enlarged sectional view of this stepped guide groove depth change. For a specific material and material thickness, the maximum resistive load due to bending is achieved by bending the shear strip to the minimum possible radius, then straightening, without fracturing. As the shear strip width increases, the maximum possible bending load also increases if the bend radius is maintained. Therefore, a higher shear load is required to keep the bend at the minimum radius. Reducing the depth of the guide groove increases the shear load. Controlling the shear load by the guide groove depth allows the energy absorber to be designed for maximum bend (without fracture), thereby optimizing the energy absorbing load during the displacement stroke.

Figure 6:
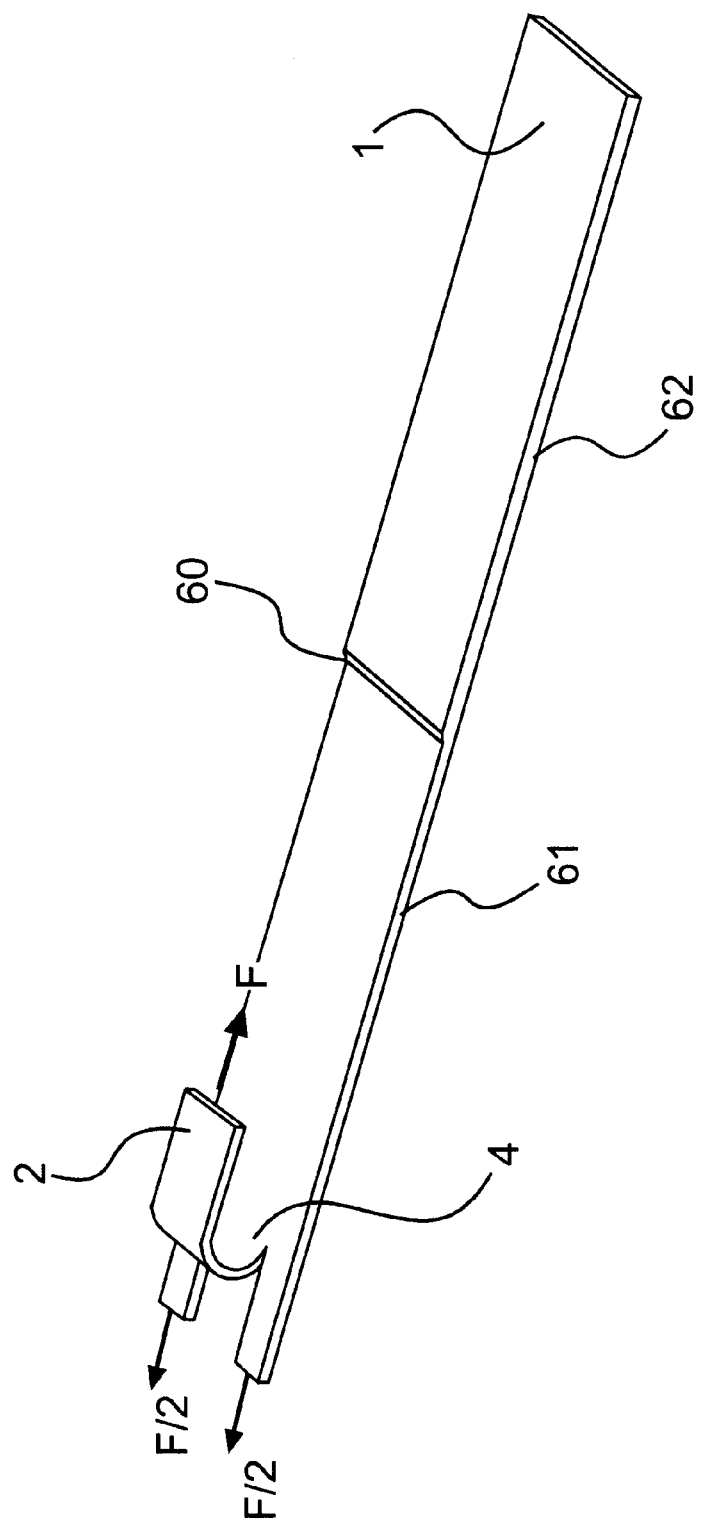
FIG. 6 is a schematic drawing of a tailored load energy absorbing shear strip bender with a variable shear strip and shear plate material thickness.

FIG. 6 illustrates another example of a tailored load/displacement energy absorber, using a varying material thickness along the length of shear strip 4. In this embodiment, as the material thickness increases, the force required to shear and bend shear strip 40 increases and thereby increases the load limit. In FIG. 6, at datum 60, the material thickness increases from the smaller thickness 61 to the larger thickness 62, thereby producing the load limit increase.

Figure 7:
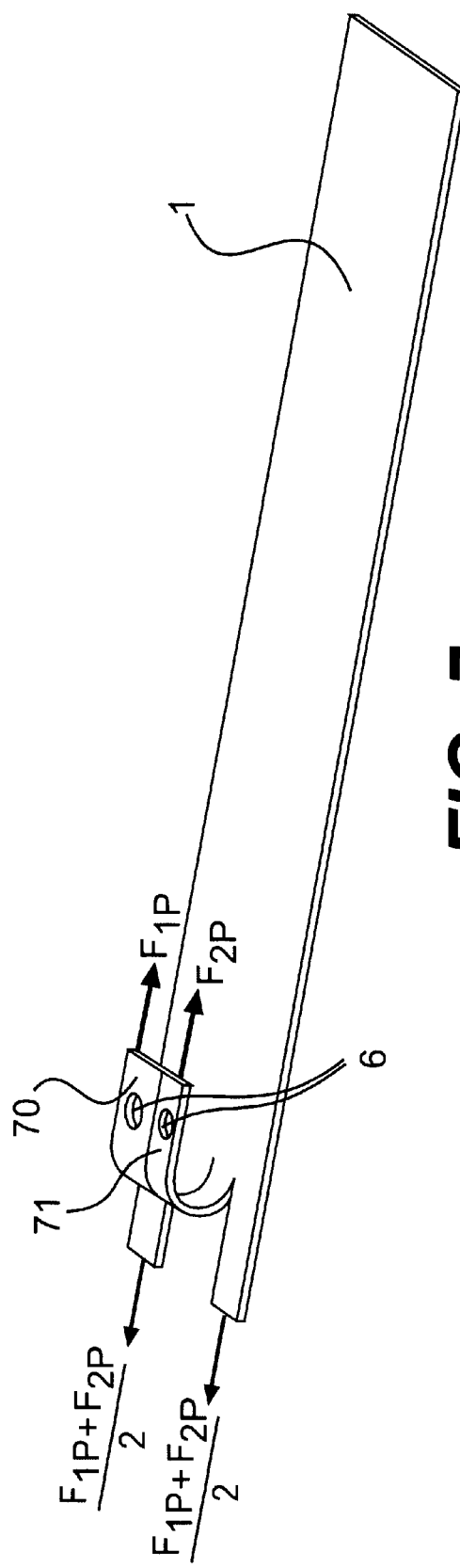
FIG. 7 is a schematic drawing of an adjustable load energy absorbing shear strip bender with multiple shear strips.

In addition to designing the present invention to provide constant and tailored load/displacement profiles, it can be adjustable, such that a user can adjust the energy absorber to provide a desired load. In a preferred embodiment of the present invention, the user pre-selects one or more shear strips from a series of shear strips formed in the energy absorber. As FIG. 7 illustrates, the user attaches one of the two objects to one or both of the two available shear strips 70 and 71. If pulled separately, shear strip 70 resists a load limit of force $F_1$, while shear strip 71 resists a load limit of force $F_2$ and the resultant reaction load $F_1$, $F_2$ or $F_1+F_2$, is located along a line coincident with the load or loads being applied. If pulled together, shear strip 70 and shear strip 71 resist a load limit equal to that of a single strip with a width of shear strips 70 and 71 ($F_{1p}+F_{2p}$, where P refers to pulling a plurality of strips instead of single strips, thereby producing a lower load than would pulling the single strips separately because of the reduced shear area). Thus, the more strips the user selects and attaches to, the higher the load limit. Although FIG. 7 shows two shear strips of unequal width, the energy absorber could contain multiple shear strips of equal or varying widths to provide a larger number of load limits from which to choose as an adjustment.

The energy absorber could also be configured such that multiple shear strips that shear on both sides are selectively engaged. Such a design would provide a higher percentage of load from the shearing process than would the concept described in the above paragraph and in FIG. 7.

Figure 8:
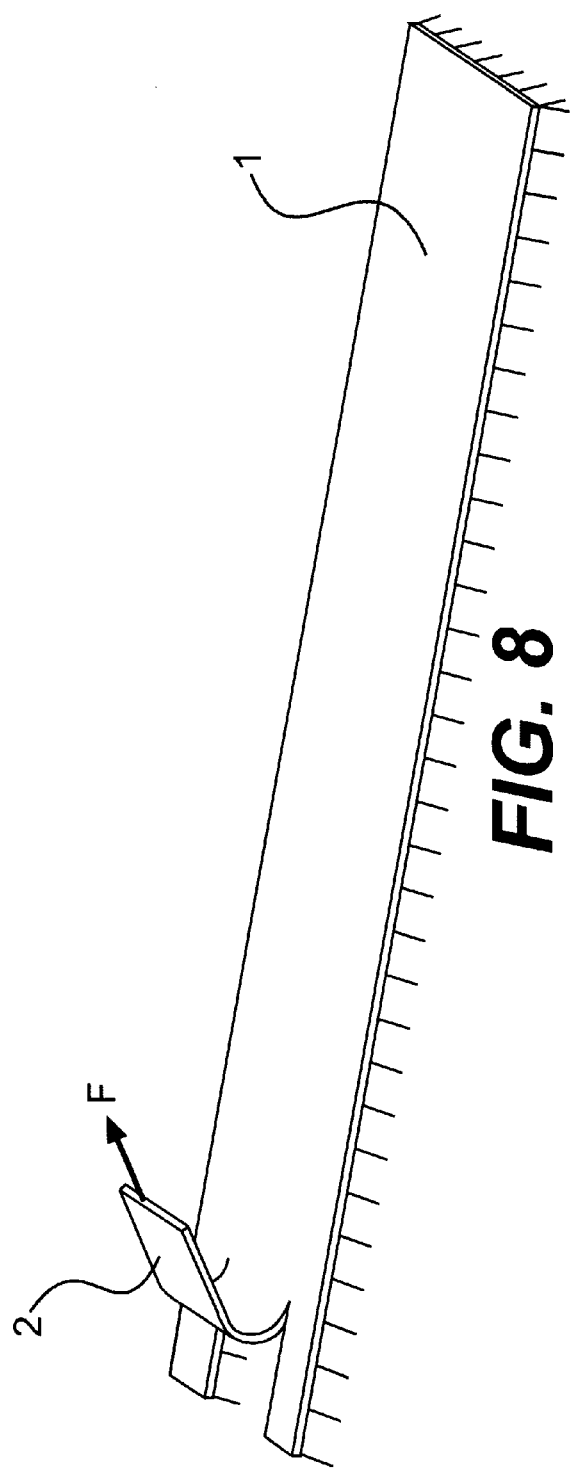
FIG. 8 is a schematic drawing of an energy absorbing shear strip bender loaded in a non-parallel direction.

With the constant, tailored, and adjustable load/displacement profiles, the preferred embodiment of the present invention directs the force separating the objects in a direction generally parallel to the shear plate. However, where a particular application precludes parallel opposing forces, the energy absorber can accommodate a separating force applied at an angle up to 90° to the shear plate. FIG. 8 shows force F applied at approximately a 45° angle. In this case, the load contributed by the bending of the shear strip is less than the load would be for a parallel force. However, to compensate for the reduced bending load, the shearing load could be increased using the techniques described above, e.g., shallower guide groove depth or increased shear strip width.

The energy absorber could also accommodate an object or objects moving through the same distance by requiring different loads from each side of the shear strip. For example, if an installation required unequal forces on opposite sides of the shear strip, one shear guide groove could be deeper than the other to provide for the unequal force requirements.

The following examples are provided to demonstrate the operation of certain embodiments of the present invention. They are not to be construed as limiting the invention in any way.

EXAMPLE 1

Figure 9:
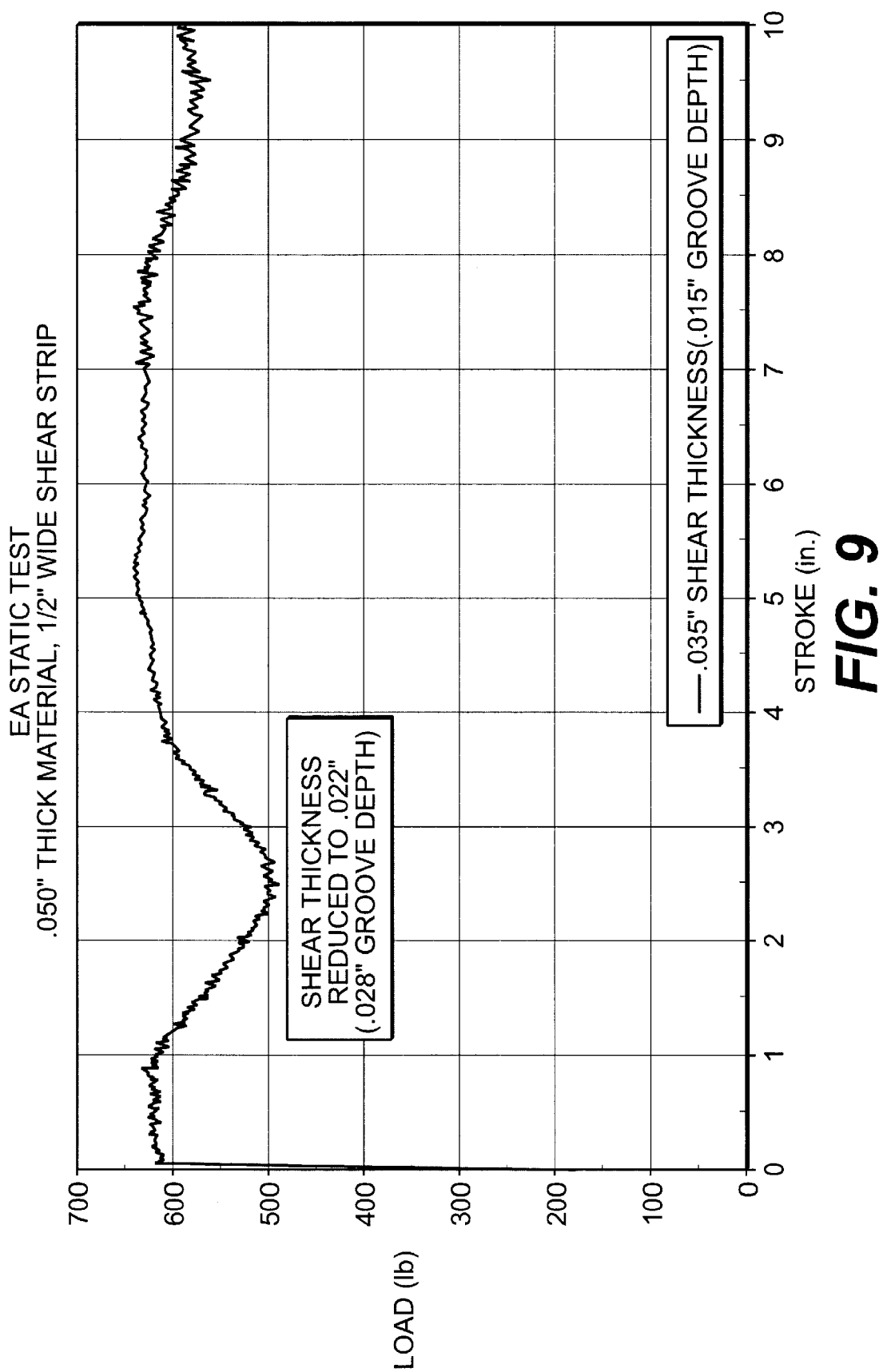
FIG. 9 is a graph illustrating load resistance as a function of stroke (displacement) and guide groove depth for a sample tailored load energy absorber.

FIG. 9 is a plot showing load resistance as a function of stroke (displacement) and guide groove depth for a tailored load. The energy absorber in this example was made from 0.050 inch thick steel and had a ½ inch constant width shear strip. Over the first 1 inch of stroke, the depth of the guide groove was 0.015 inches. Then, from approximately 1 to 2.5 inches of stroke, the guide groove depth gradually increased to a maximum of 0.028 inches. From approximately 2.5 to 4 inches, the guide groove gradually decreased to its starting depth of 0.015 inches. The graph shows data for a 2 inch per minute constant rate displacement. The load decrease of over 100 pounds reflects the guide groove depth increase from 0.015 to 0.028 inches. The guide groove depth changes in this example were ramp functions, rather than step functions, as evidenced by the smooth change in load.

EXAMPLE 2

Figure 10:
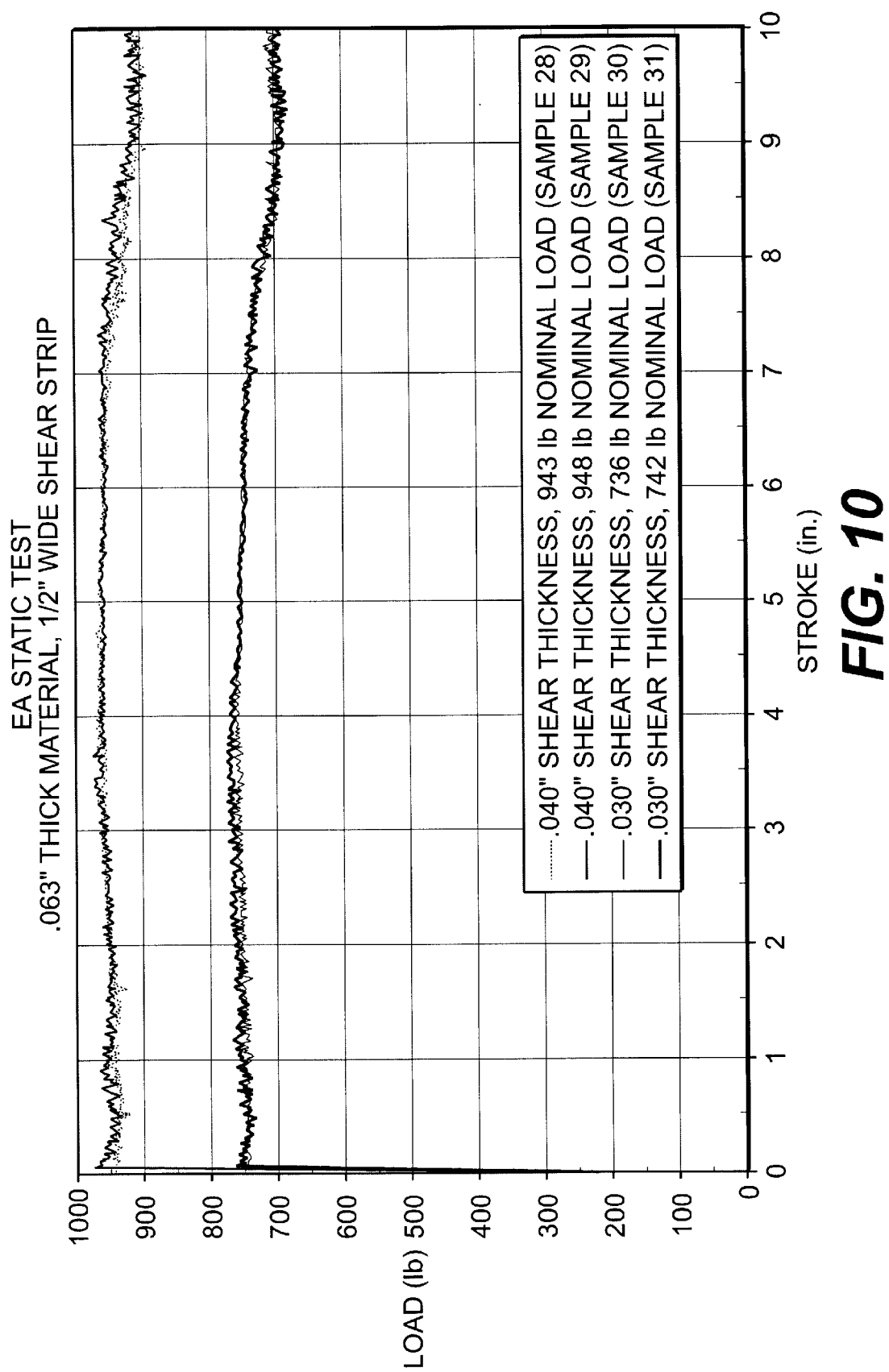
FIG. 10 is a graph illustrating load resistance as a function of stroke (displacement) and guide groove depth for four constant load energy absorber sample.

FIG. 10 is also a plot of load resistance as a function of stroke (displacement) and guide groove depth. It compares four constant load samples having two different guide groove depths (a 0.010 inch difference). Both energy absorber samples were made of 0.063 inch thick steel and had ½ inch constant width shear strips. However, two samples had a 0.040 inch guide groove shear thickness while the other two had a shear thickness of 0.030 inch. The graph shows data for a 2 inch per minute constant rate displacement. As FIG. 10 illustrates, the 0.030 inch shear thickness yielded a constant load/displacement profile of approximately 750 pounds while the 0.040 inch shear thickness produced a constant load/displacement profile of approximately 950 pounds. Because all other structural characteristics of the samples were equal, the 0.010 inch difference in guide groove depth accounts for the difference in constant load resistance between the samples. These data also demonstrate the repeatability of like designs.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An energy absorber comprising:

(a) a shear plate;

(b) a plurality of shear strip tabs formed by bending sections of the shear plate through an angle of at least 90° to the shear plate, wherein each shear strip tab of the plurality of shear strip tabs has a common edge with the shear plate, said common edge having two ends;

(c) a plurality of shear guide grooves formed in a face of the shear plate, extending from the two ends of the common edge of the each shear strip tab away from the each shear strip tab;

(d) a means for attaching the plurality of shear strip tabs to a first object; and (e) a means for attaching the shear plate to a second object, wherein said energy absorber provides a predetermined load resistance during displacement of the first object relative to the second object, wherein the means for attaching the plurality of shear strip tabs is selectable such that one or more shear strip tabs of the plurality of shear strip tabs can be attached.

2. The energy absorber of claim 1, wherein each shear strip tab of the plurality of shear strip tabs is a different width.

3. The energy absorber of claim 1, wherein said plurality of shear strip tabs is bent through an angle of about 170° to about 185°.

4. The energy absorber of claim 1, wherein at least one of the plurality of shear guide grooves has a variable depth.

5. The energy absorber of claim 4, wherein the variable depth is one of stepped and ramped.

6. The energy absorber of claim 1, wherein the plurality of shear guide grooves has variable depths.

7. The energy absorber of claim 6, wherein the variable depths of the plurality of shear guide grooves are equal.

8. The energy absorber of claim 6, wherein the variable depths of the plurality of shear guide grooves are unequal.

9. A method for constructing an energy absorber comprising the steps of:

(a) bending a section of a shear plate through an angle greater than 90° to the shear plate, such that a shear strip tab is formed, the shear strip tab having a first common edge with the shear plate, the first common edge having two ends;

(b) forming a plurality of shear guide grooves on a face of the shear plate, wherein each shear guide groove extends from the two ends of the first common edge of the shear strip tab, and wherein at least one of the shear guide grooves has a variable depth;

(c) forming on the shear strip tab a means for attaching the shear strip tab;

(d) forming on the shear plate a means for attaching the shear plate;

(e) forming a plurality of shear strip tabs on the shear plate, such that each shear strip tab of the plurality of shear strip tabs has two corners that contact the shear plate;

(f) bending a plurality of sections of the shear plate through an angle greater than 90° to the shear plate, such that a plurality of shear strip tabs is formed such that each shear strip tab of the plurality of shear strip tabs has a common edge with the shear plate where the shear plate transitions into the plurality of shear strip tabs, the common edge having two ends;

(g) forming a second plurality of shear guide grooves on a face of the shear plate, wherein each shear guide groove of the second plurality of shear guide grooves extends from the two ends of the each shear strip tab; and (h) forming in the plurality of shear strip tabs a plurality of means for attaching the plurality of shear strip tabs, wherein the means for attaching the plurality of shear strip tabs is selectable such that one or more shear strip tabs of the plurality of shear strip tabs can be attached.

10. A method for constructing an energy absorber comprising the steps of:

(a) bending a section of a shear plate through an angle greater than 90° to the shear plate, such that a shear strip tab is formed, the shear strip tab having a first common edge with the shear plate, the first common edge having two ends, wherein the shear plate has a variable thickness;

(b) forming a plurality of shear guide grooves on a face of the shear plate, wherein each shear guide groove extends from the two ends of the first common edge of the shear strip tab;

(c) forming on the shear strip tab a means for attaching the shear strip tab;

(d) forming on the shear plate a means for attaching the shear plate;

(e) forming a plurality of shear strip tabs on the shear plate, such that each shear strip tab of the plurality of shear strip tabs has two corners that contact the shear plate;

(f) bending a plurality of sections of the shear plate through an angle greater than 90° to the shear plate, such that a plurality of shear strip tabs is formed such that each shear strip tab of the plurality of shear strip tabs has a common edge with the shear plate where the shear plate transitions into the plurality of shear strip tabs, the common edge having two ends;

(g) forming a second plurality of shear guide grooves on a face of the shear plate, wherein each shear guide groove of the second plurality of shear guide grooves extends from the two ends of the each shear strip tab; and (h) forming in the plurality of shear strip tabs a plurality of means for attaching the plurality of shear strip tabs, wherein the means for attaching the plurality of shear strip tabs is selectable such that one or more shear strip tabs of the plurality of shear strip tabs can be attached.

11. A method for constructing an energy absorber comprising the steps of:

(a) bending sections of a shear plate through an angle greater than 90° to the shear plate, such that a plurality of shear strip tabs is formed, with each shear strip tab having a common edge with the shear plate, the common edge having two ends;

(b) forming a plurality of shear guide grooves on a face of the shear plate, wherein each shear guide groove extends from the two ends of the common edge of the plurality of shear strip tabs;

(c) forming in the plurality of shear strip tabs a plurality of means for attaching the plurality of shear strip tabs, wherein the means for attaching the plurality of shear strip tabs is selectable such that one or more shear strip tabs of the plurality of shear strip tabs can be attached; and (d) forming on the shear plate a means for attaching the shear plate.

12. The method of claim 11, wherein at least one of the plurality of shear guide grooves has a variable depth.

13. The method of claim 11, wherein the shear plate has a variable thickness.

* * * * *